US012073573B2

(12) United States Patent
Kumagai et al.

(10) Patent No.: US 12,073,573 B2
(45) Date of Patent: Aug. 27, 2024

(54) OPHTHALMOLOGIC IMAGE PROCESSING DEVICE AND NON-TRANSITORY COMPUTER-READABLE STORAGE MEDIUM STORING COMPUTER-READABLE INSTRUCTIONS

(71) Applicant: NIDEK CO., LTD., Gamagori (JP)

(72) Inventors: Yoshiki Kumagai, Gamagori (JP); Ryosuke Shiba, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 618 days.

(21) Appl. No.: 17/217,928

(22) Filed: Mar. 30, 2021

(65) Prior Publication Data
US 2021/0304427 A1  Sep. 30, 2021

(30) Foreign Application Priority Data
Mar. 30, 2020 (JP) .................. 2020-059677

(51) Int. Cl.
G06T 7/37 (2017.01)
G06T 7/00 (2017.01)
G06T 11/00 (2006.01)

(52) U.S. Cl.
CPC .............. *G06T 7/37* (2017.01); *G06T 7/0012* (2013.01); *G06T 11/008* (2013.01);
(Continued)

(58) Field of Classification Search
CPC ......... A61B 3/102; A61B 3/0025; A61B 3/14; A61B 3/12; A61B 5/0066; A61B 3/10;
(Continued)

(56) References Cited

U.S. PATENT DOCUMENTS 8,857,988 B2 * 10/2014 Sharma .................. A61B 3/102
351/209
9,763,569 B2 * 9/2017 Fingler ................ A61B 3/0025
(Continued)

FOREIGN PATENT DOCUMENTS

CN         105939652 A   * 9/2016 ........... A61B 3/0025
JP         2018-038611 A   3/2018
WO   WO-2011108231 A1 * 9/2011 ........... A61B 3/0058

OTHER PUBLICATIONS

Machine translation of CN-105939652-A (Year: 2016).*

*Primary Examiner* — Aaron W Carter
*Assistant Examiner* — Courtney Joan Nelson
(74) *Attorney, Agent, or Firm* — Oliff PLC (57) ABSTRACT

A processor of an ophthalmologic image processing device acquires intermediate information from which an influence of a position shift with respect to a first direction at each position in a second direction is excluded, for each of a first ophthalmologic image and a second ophthalmologic image (S4). The processor performs alignment with respect to the second direction between the first ophthalmologic image and the second ophthalmologic image, based on the intermediate information (S5, S6). The processor performs alignment with respect to the first direction between pixels at the same position with respect to the second direction in the first ophthalmologic image and the second ophthalmologic image for which the alignment with respect to the second direction has been performed (S7).

6 Claims, 9 Drawing Sheets

(52) U.S. Cl.
CPC ............... *G06T 2207/10028* (2013.01); *G06T 2207/10101* (2013.01); *G06T 2207/30041* (2013.01); *G06T 2210/41* (2013.01)

(58) Field of Classification Search
CPC ........... A61B 3/1005; A61B 8/10; A61B 3/13; A61B 5/14555; A61B 3/0058; G06T 2207/30041; G06T 2207/10101; G06T 7/0012; G06T 11/008; G06T 3/0068; G06T 5/006; G06T 7/20; G06T 7/32; G06T 2219/2004; G06T 2207/20056; G06T 2210/41; G06T 7/37
See application file for complete search history.

(56) References Cited

U.S. PATENT DOCUMENTS

| | | | |
|---|---|---|---|
| 10,402,965 B1 * | 9/2019 | Bagherinia | ............... G06T 7/11 |
| 2018/0064336 A1 | 3/2018 | Kano et al. | |

* cited by examiner

OPHTHALMOLOGIC IMAGE PROCESSING DEVICE AND NON-TRANSITORY COMPUTER-READABLE STORAGE MEDIUM STORING COMPUTER-READABLE INSTRUCTIONS

CROSS REFERENCE TO RELATED APPLICATION

This application is based upon and claims the benefit of priority of Japanese Patent Application No. 2020-059677 filed on Mar. 30, 2020, the contents of which are incorporated herein by reference in its entirety.

BACKGROUND

The present disclosure relates to an ophthalmologic image processing device and a non-transitory computer-readable medium storing computer-readable instructions that process ophthalmologic image data acquired by scanning an eye with light.

A technique that acquires an ophthalmologic image by scanning a tissue of a subject eye with light and continuously receiving the light from the tissue has been known. The same part in a tissue of the same subject eye is photographed several times to acquire a plurality of the ophthalmologic images, and then, for example, an influence of a noise might be suppressed by averaging a plurality of the ophthalmologic images, or a motion contrast image that indicates the motion of the tissue might be generated. Further, a change in time of the tissue might be checked based on a plurality of the ophthalmologic images generated by photographing the same part at difference times. In these cases, it is preferable that later processes are executed after the alignment between the ophthalmologic images is appropriately performed.

For example, Japanese Unexamined Patent Application Publication No. 2018-038611 discloses that a position shift with respect an X-Y direction between the image data is corrected by performing the alignment with respect to a crossing direction (X-Y direction) of a measurement light, and then the alignment with respect to a depth direction is performed.

SUMMARY

In a case in which the alignment between the ophthalmologic images extending in a first direction and a second direction crossing the first direction is performed, it is preferable that both of the alignment with respect to the first direction and the alignment with respect to the second direction are performed. However, in a case in which both of the position shift with respect to the first direction and the position shift with respect to the second direction are caused, it has been difficult to precisely perform the alignment with respect to one direction while maintaining the position shift with respect to the other direction, using the conventional technique. For example, in a case in which the same part is photographed several times, distortion might be caused in the ophthalmologic image in response to the posture of the subject eye. In particular, in a case in which the alignment between the ophthalmologic images having the distortion is performed, it has been difficult to improve the precision of the alignment by using the conventional technique.

Embodiments of the broad principles derived herein provide an ophthalmologic image processing device and a non-transitory computer-readable medium storing computer-readable instructions that are capable of appropriately performing alignment of a plurality of ophthalmologic images generated by photographing the same part in a tissue of the same subject eye.

Embodiments of a first aspect provide an ophthalmologic image processing device that processes data of an ophthalmologic image of a tissue of a subject eye. The ophthalmologic image is a scanning image that extends in a first direction and a second direction crossing the first direction and is acquired by scanning the tissue of the subject eye with light and temporally continuously receiving the light from the tissue. A processor of the ophthalmologic image processing device performs: acquiring images of a first ophthalmologic image and a second ophthalmologic image generated by photographing the same part in the tissue of the same subject eye; acquiring intermediate information that is information of the ophthalmologic image from which an influence of a position shift with respect to the first direction at each position in the second direction is excluded, for each of the first ophthalmologic image and the second ophthalmologic image; first alignment that performs alignment with respect to the second direction between the first ophthalmologic image and the second ophthalmologic image, based on the intermediate information acquired from the first ophthalmologic image and the intermediate information acquired from the second ophthalmologic image; and second alignment that performs alignment with respect to the first direction between pixels at the same position with respect to the second direction in the first ophthalmologic image and the second ophthalmologic image for which the alignment with respect to the second direction has been performed in the first alignment.

Embodiments of a second aspect provides a non-transitory computer-readable storage medium storing computer-readable instructions executed by a processor of an ophthalmologic image processing device that processes data of an ophthalmologic image of a tissue of a subject eye. The ophthalmologic image is a scanning image that extends in a first direction and a second direction crossing the first direction and is acquired by scanning the tissue of the subject eye with light and temporally continuously receiving the light from the tissue. When executed by the processor of the ophthalmologic image processing device, the instructions causes the ophthalmologic image processing device to perform processes including: acquiring images of a first ophthalmologic image and a second ophthalmologic image generated by photographing the same part in the tissue of the same subject eye; acquiring intermediate information that is information of the ophthalmologic image from which an influence of a position shift with respect to the first direction at each position in the second direction is excluded, for each of the first ophthalmologic image and the second ophthalmologic image; first alignment that performs alignment with respect to the second direction between the first ophthalmologic image and the second ophthalmologic image, based on the intermediate information acquired from the first ophthalmologic image and the intermediate information acquired from the second ophthalmologic image; and second alignment that performs alignment with respect to the first direction between pixels at the same position with respect to the second direction in the first ophthalmologic image and the second ophthalmologic image for which the alignment with respect to the second direction has been performed in the first alignment.

According to the ophthalmologic image processing device and the non-transitory computer-readable storage medium storing the computer-readable instructions, the alignment between the ophthalmologic images generated by photographing the same part in the tissue of the same subject eye is appropriately performed.

DETAILED DESCRIPTION

An ophthalmologic image processing device exemplarily described in the present disclosure processes data of an ophthalmologic image of a tissue of a subject eye. The ophthalmologic image is a scanning image that extends in a first direction and a second direction crossing the first direction and is acquired (photographed) by scanning the tissue of the subject eye with light and temporally continuously receiving light (for example, reflection light or the like) from the tissue. A processor of the ophthalmologic image processing device performs acquiring images, acquiring intermediate information, first alignment, and second alignment. In the acquiring images, the processor acquires a first ophthalmologic image and a second ophthalmologic image generated by photographing the same part in the tissue of the same subject eye. In the acquiring intermediate information, the processor acquires intermediate information that is information of the ophthalmologic image from which an influence of a position shift with respect to the first direction at each position in the second direction is excluded, for each of the first ophthalmologic image and the second ophthalmologic image. That is, the intermediate information represents an unchanging characteristic against the position shift with respect to the first direction at each position in the second direction. In the first alignment, the processor performs alignment with respect to the second direction between the first ophthalmologic image and the second ophthalmologic image, based on the intermediate information acquired from the first ophthalmologic image and the intermediate information acquired from the second ophthalmologic image. In the second alignment, the processor performs alignment with respect to the first direction between pixels at the same position with respect to the second direction in the first ophthalmologic image and the second ophthalmologic image for which the alignment with respect to the second direction has been performed in the first alignment.

According to the technique in the present disclosure, firstly, the intermediate information that is information of the ophthalmologic image from which the influence of the position shift with respect to the first direction at each position in the second direction is excluded is acquired for each of the first ophthalmologic image and the second ophthalmologic image acquired by photographing the same part. And then, the alignment with respect to the second direction between the first ophthalmologic image and the second ophthalmologic image is performed based on the intermediate information of the first ophthalmologic image and the intermediate information of the second ophthalmologic image. Accordingly, the alignment with respect to the second direction between the first ophthalmologic image and the second ophthalmologic image is precisely performed in a state in which the influence of the position shift with respect to the first direction is suppressed. Thereafter, the alignment with respect to the first direction between the pixels at the same position with respect to the second direction in the first ophthalmologic image and the second ophthalmologic image for which the alignment with respect to the second direction has been performed is performed. Accordingly, the alignment with respect to the first direction is also precisely performed in a state in which the influence of the position shift with respect to the second direction is suppressed. Thus, even in a case in which both of the position shift with respect to the first direction and the position shift with respect to the second direction are caused between the ophthalmologic images, the alignment between the ophthalmologic images is appropriately performed. For example, even in a case in which the alignment between the ophthalmologic images having distortion is performed, both of the alignment with respect to the first direction and the alignment with respect to the second direction are precisely performed. Also in a case in which a specific structure useful for the alignment is not photographed in the ophthalmologic image, the precision of the alignment is improved.

The ophthalmologic image may be a two-dimensional image. In this case, the first direction and the second direction may be one-dimensional directions crossing (for example, orthogonal) to each other. While, the ophthalmologic image may be a three-dimensional image. In this case, one of the first direction and the second direction may be a two-dimensional direction (plane direction) and the other one may be a one-dimensional direction.

The intermediate information may be information of a power spectrum image that is acquired by applying the Fourier transform with respect to the first direction, to the ophthalmologic image (each of the first ophthalmologic image and the second ophthalmologic image). In this case, the power spectrum image indicates an absolute value of amplitude in each frequency at each position in the second direction. Accordingly, in the acquired power spectrum image, the influence of the position shift with respect to the first direction is excluded. Thus, by adopting the information of the power spectrum image as the intermediate information, the alignment with respect to the second direction between the first ophthalmologic image and the second ophthalmologic image is precisely performed in a state in which the influence of the position shift with respect to the first direction is suppressed.

While, the content of the intermediate information may be modified. For example, information that indicates at least one of statics such as average luminance, maximum luminance, and standard deviation of luminance of pixels aligned in the first direction, luminance histogram in the first direction, and data sorted by luminance, at each position in the second direction may be adopted as the intermediate information. Further, image information for which a position in the first direction of at each pixel at each position in the second direction is adjusted such that the correlation to the pixels adjacent thereto in the second direction becomes high, may be adopted as the intermediate information. Also in these cases, the influence of the position shift with respect to the first direction at each position in the second direction is excluded in the intermediate information.

In the first alignment, the processor may perform alignment (general alignment) in which the alignment with respect to the second direction between the first ophthalmologic image and the second ophthalmologic image is performed while keeping a relative positional relation in the second direction within each of the first ophthalmologic image and the second ophthalmologic image. In this case, the alignment with respect to the second direction between the first ophthalmologic image and the second ophthalmologic image is performed while keeping the relative positional relation at each position in the second direction within the image as a whole. Accordingly, the general alignment with respect to the second direction is easily performed.

A specific method of the general alignment may be selected as needed. For example, the processor may perform the alignment with respect to the second direction using the phase only correlation with reference to the intermediate information of the first ophthalmologic image and the intermediate information of the second ophthalmologic image. In the phase only correlation, the image information is subjected to the Fourier transform to be decomposed into the information of the amplitude and the information of the phase. And then, the processor acquires the correlation between the images using only the phase information without using the amplitude information in which the shape information is not included, so that the alignment between the images is appropriately performed.

In the second alignment, the phase only correlation may be used when performing the alignment with respect to the first direction between the pixels at the same position in the second direction in the first ophthalmologic image and the second ophthalmologic image. Also in this case, the alignment with respect to the first direction at each position in the second direction is appropriately performed using the phase information.

However, a specific method of the second alignment may be modified. For example, the processor may perform the alignment with respect to the first direction by moving the pixel in the first direction in one of the ophthalmologic images such that the correlation between the pixels at the same position in the second direction in the first ophthalmologic image and the second ophthalmologic image becomes high.

In the first alignment, the processor may perform alignment with respect to the second direction (individual alignment), for each position in the second direction. In this case, even when the position shift amount with respect to the second direction between the first ophthalmologic image and the second ophthalmologic image is different depending on its position in the second direction, the alignment with respect to the second direction between the first ophthalmologic image and the second ophthalmologic image is precisely performed.

A specific method of the individual alignment may be selected as needed. For example, the processor may perform the alignment between the images for each position in the second direction using a matching based on the dynamic programming (so-called DP matching or elastic matching). Further, the processor may approximate a position correction amount in the second direction for the alignment between the images at each position in the second direction, by a function.

An ophthalmologic image photographing device that photographs the ophthalmologic image may be an OCT device that photographs a tomographic image of a tissue by scanning the tissue with a spot-like measurement light. The first direction may be an A-scanning direction defined by a depth direction of the tissue along the optical axis of the measurement light. The second direction may be a B-scanning direction defined by a scanning direction of the tissue with the measurement light. In this case, in the ophthalmologic image, not only might be a position shift with respect to the B-scanning direction caused when scanning the tissue with the measurement light but also a position shift with respect to the A-scanning direction in each A-scanning image might be caused. In particular, the distortion might be caused in the ophthalmologic image photographed by the OCT device and it might be hard that a characteristic structure that is useful for defining the reference of the alignment is photographed. Against this, the ophthalmologic image processing device in the present disclosure cancels both of the position shift with respect to the A-scanning direction and the position shift with respect to the B-scanning direction and thereby appropriately performs the alignment between the ophthalmologic images.

An ophthalmologic image photographing device that photographs the ophthalmologic image may be configured to photograph an image of a tissue by scanning the tissue with a spot-like light on a scanning line along a main scanning direction and by moving the scanning line in a sub scanning direction crossing the main scanning direction (for example, a scanning laser ophthalmoscope (SLO) or the like). The first direction may be the main scanning direction, and the second direction may be the sub scanning direction. In this case, not only might be the position shift between the scanning lines caused when the scanning line is being moved in the sub scanning direction but also the position shift might be caused when the light is being moved on each scanning line in the ophthalmologic image. Against this, the ophthalmologic image processing device in the present disclosure cancels both of the position shift with respect to the main scanning direction and the position shift with respect to the sub scanning direction and thereby appropriately performs the alignment between the ophthalmologic images.

However, the ophthalmologic image photographing device that photographs the ophthalmologic image is not limited to the devices described above. For example, the ophthalmologic image photographing device may be a device that photographs the ophthalmologic images by irradiating a two-dimensional region with light extending in a one-dimensional direction (for example, a line scan SLO, a line scan OCT, or the like). In this case, the first direction may be the one-dimensional direction in which the light to be irradiated extends, and the second direction may be the scanning direction of the light. Further, the ophthalmologic image photographing device may be a rolling shutter type photographing device or the like. The ophthalmologic image photographing device may generate the data of the ophthalmologic image by receiving the reflection light reflected by the tissue, or by receiving light (for example, fluorescence) emitted from the tissue irradiated with light.

In the method described above, a direction of the light to be irradiated simultaneously, or a direction in which a scanning speed of the light is faster than a scanning speed of the others (namely, the A-scanning direction or the main scanning direction of the OCT device, or a direction in which a scanning line extends in a line scanning) is defined as the first direction, and a direction crossing (orthogonally crossing) the first direction (namely, the B-scanning direction or the sub scanning direction of the OCT device, or the scanning direction in the line scanning) is defined as the second direction. However, even in a case in which the first direction and the second direction are reversed, the alignment between the ophthalmologic images is appropriately performed.

Hereinafter, one typical embodiment of the present disclosure will be described. The present embodiment describes an example that processes an ophthalmologic image of a fundus tissue of a subject eye E photographed by an OCT device. The ophthalmologic image to be processed may be an image of a tissue other than the fundus tissue. For example, the ophthalmologic image to be processed may be an image of a tissue of the subject eye E (for example, anterior ocular segment) other than a fundus tissue, or an image of a tissue of a living body (for example, skin, digestive organ, or brain) other than the subject eye E. As described above, the photographing device that photographs the image is not limited to the OCT device.

Figure 1:
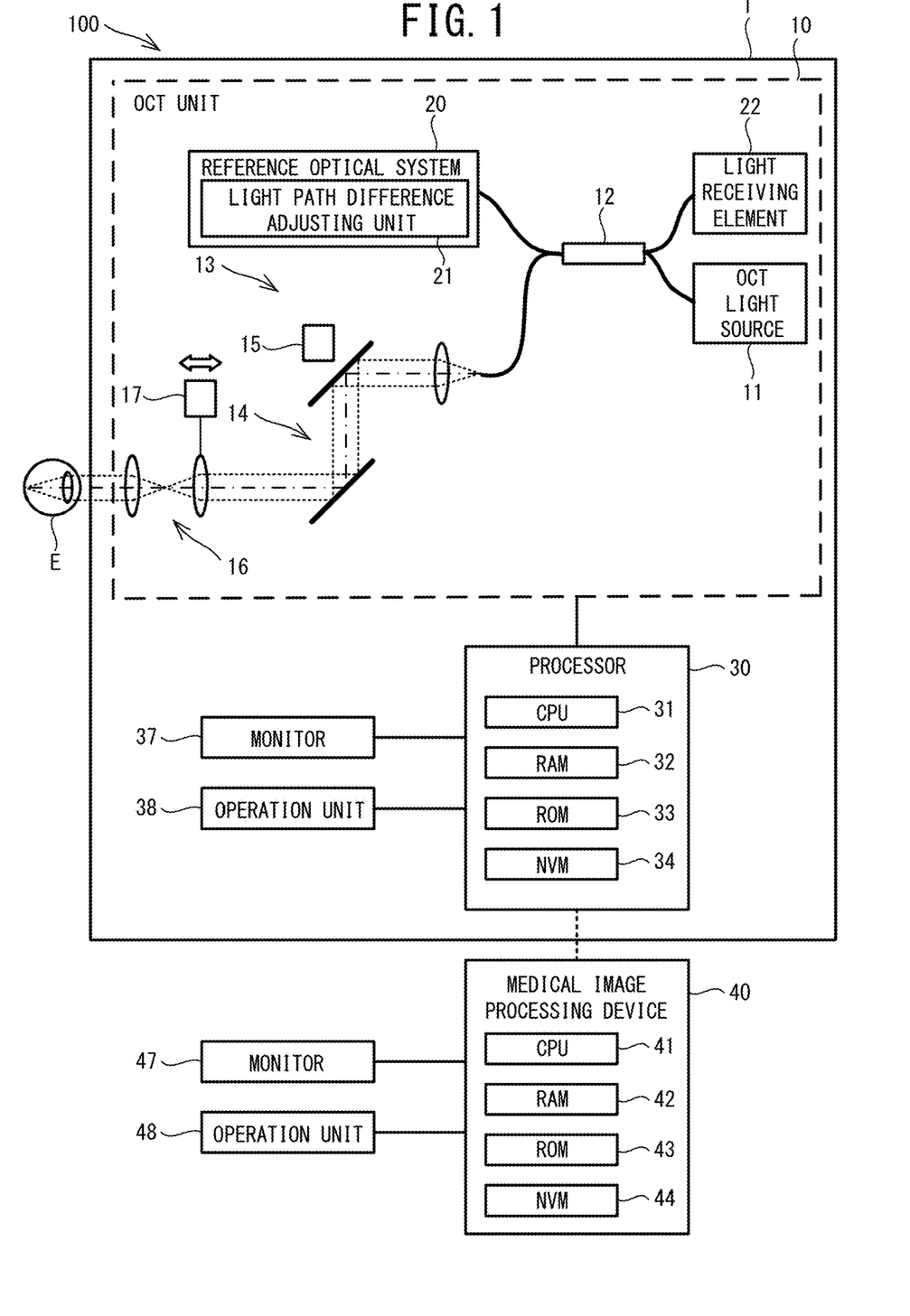
FIG. 1 is a block diagram illustrating a schematic configuration of an ophthalmologic image processing system 100.

A schematic configuration of an ophthalmologic image processing system 100 of the present embodiment is described with reference to FIG. 1. The ophthalmologic image processing system 100 of the present embodiment is provided with an ophthalmologic image photographing device 1 and an ophthalmologic image processing device 40. The ophthalmologic image photographing device 1 photographs a scanned image extending in a first direction and a second direction crossing the first direction, by scanning a tissue of a living body with light and temporally continuously receiving the light from the tissue. The ophthalmologic image processing device 40 performs a process of data of the ophthalmologic image acquired (photographed) by the ophthalmologic image photographing device 1 (specifically, a process that performs the alignment between the ophthalmologic images generated by photographing the same part). In the present embodiment, a process that performs the alignment between two-dimensional ophthalmologic images will be exemplarily described.

A configuration of the ophthalmologic image photographing device 1 of the present embodiment is described. The ophthalmologic image photographing device (OCT device) 1 is provided with an OCT unit 10 and a processor unit 30. The OCT unit 10 is provided with an OCT light source 11, a coupler (beam splitter) 12, a measurement optical system 13, a reference optical system 20, and a light receiving element 22.

The OCT light source 11 emits light (OCT light) for the acquisition of the image data. The coupler 12 branches the OCT light emitted from the OCT light source 11 into a measurement light and a reference light. Further, the coupler 12 of the present embodiment multiplexes the measurement light reflected by a tissue (fundus of the subject eye E in the present embodiment) and the reference light generated by the reference optical system 20 and causes them to interfere. That is, the couple 12 of the present embodiment functions as both of a branching optical element that branches the OCT light into the measurement light and the reference light and a multiplexing optical element that multiplexes a reflection light of the measurement light and the reference light. Here, at least one of the branching optical element and the multiplexing optical element may be modified. For example, an element other than the coupler (for example, circulator, beam splitter, or the like) may be adopted as the optical element.

The measurement optical system 13 introduces the measurement light branched by the coupler 12 into a subject and returns the measurement light reflected by the tissue to the coupler 12. The measurement optical system 13 is provided with a scanning unit (scanner) 14, an irradiating optical system 16, and a focus adjusting unit 17. The scanning unit 14 is driven by a driving unit 15 so as to scan a subject with the spot-like measurement light in a two-dimensional direction crossing an optical axis of the measurement light. In the present embodiment, two galvanometer mirrors that polarize the measurement light to different directions respectively are adopted as the scanning unit 14. However, other device (for example, at least one of polygon mirror, resonant scanner, acoustic optical element and the like) that polarizes light may be adopted as the scanning unit 14. The irradiating optical system 16 is arranged at a downstream side (namely, a side of the subject) in a light path with respect to the scanning unit 14 so as to irradiate a tissue with the measurement light. The focus adjusting unit 17 moves an optical member (for example, lens) installed in the irradiating optical system 16 in a direction along the optical axis of the measurement light so as to adjust focus of the measurement light.

The reference optical system 20 generates the reference light and returns the reference light to the coupler 12. The reference optical system 20 of the present embodiment generates the reference light by reflecting the reference light branched by the coupler 12 using a reflection optical system (for example, reference mirror). However, the reference optical system 20 may be also modified. For example, the reference optical system 20 may transmit the light incident from the coupler without reflecting the light and then return the light to the coupler 12. The reference optical system 20 is provided with a light path difference adjusting unit 21 that changes a difference between a light path of the measurement light and a light path of the reference light. In the present embodiment, the reference mirror is moved in the optical axis to change the difference of the light paths. A component that changes the difference of the light paths may be provided in the light path of the measurement optical system 13.

The light receiving element 22 receives the interference light of the measurement light and the reference light generated by the coupler 12 to detect an interference signal. The present embodiment adopts a principle of Fourier domain OCT. In the Fourier domain OCT, spectrum intensity (spectrum interference signal) of the interference light is detected by the light receiving element 22, so that a plurality of OCT signals is acquired through the Fourier transform against the spectrum intensity data. As one example of the Fourier domain OCT, Spectral-domain-OCT (SD-OCT), Swept-source-OCT (SS-OCT) or the like can be adopted. Further, for example, Time-domain-OCT (TD-OCT) can be also adopted.

The processor unit 30 controls the ophthalmologic image photographing device 1. The processor unit 30 is provided with a CPU 31, a RAM 32, a ROM 33, and a non-volatile memory (NVM) 34. The CPU 31 is a controller. The RAM 32 temporarily stores various information. The ROM 33 stores a program executed by the CPU 31, various initial values, and the like. The NVM 34 is a non-transitory storage medium that can keep the stored contents after the power is shutdown.

A monitor 37 and an operation unit 38 are connected to the processor unit 30. The monitor 37 is one example of a display unit that displays various images. The operation unit 38 is operated by a user for inputting various instructions of the user into the ophthalmologic image photographing device 1. For example, various devices such as a mouse, a keyboard, a touch panel, and a foot switch can be adopted as the operation unit 38. The various instructions may be input into the ophthalmologic image photographing device 1 by a sound input into a microphone.

A schematic configuration of the ophthalmologic image processing device 40 is described. In the present embodiment, a personal computer (hereinafter, referred to as "PC") is adopted as the ophthalmologic image processing device 40. However, a device other than the PC may be adopted as the ophthalmologic image processing device. For example, the ophthalmologic image photographing device 1 itself may function as the ophthalmologic image processing device that performs the alignment of a plurality of the ophthalmologic images. The ophthalmologic image processing device 40 is provided with a CPU 41, a RAM 42, a ROM 43, and an NVM 44. The CPU 41 is a controller. Each of The RAM 42, the ROM 43, and the NVM 44 temporarily stores various information as described above. An ophthalmologic image processing program for performing an ophthalmologic image process (see FIG. 4) described below may be stored in the NVM 44. Further, a monitor 47 and an operation unit 48 are connected to the ophthalmologic image processing device 40. The monitor 47 is one example of a display unit that displays various images. The operation unit 48 is operated by a user for inputting various instructions of the user into the ophthalmologic image processing device 40. Similar to the operation unit 38 of the ophthalmologic image photographing device 1, various devices such as a mouse, a keyboard, and a touch panel can be adopted as the operation unit 48. Further, the various instructions may be input into the ophthalmologic image processing device 40 by a sound input into a microphone.

The ophthalmologic image processing device 40 acquires various data (for example, data of an ophthalmologic image photographed by the ophthalmologic image photographing device 1, or the like) from the ophthalmologic image photographing device 1. The various data may be acquired through, for example, at least one of wired communication, wireless communication, a detachable storage medium (for example, USB memory) and the like.

Figure 2:
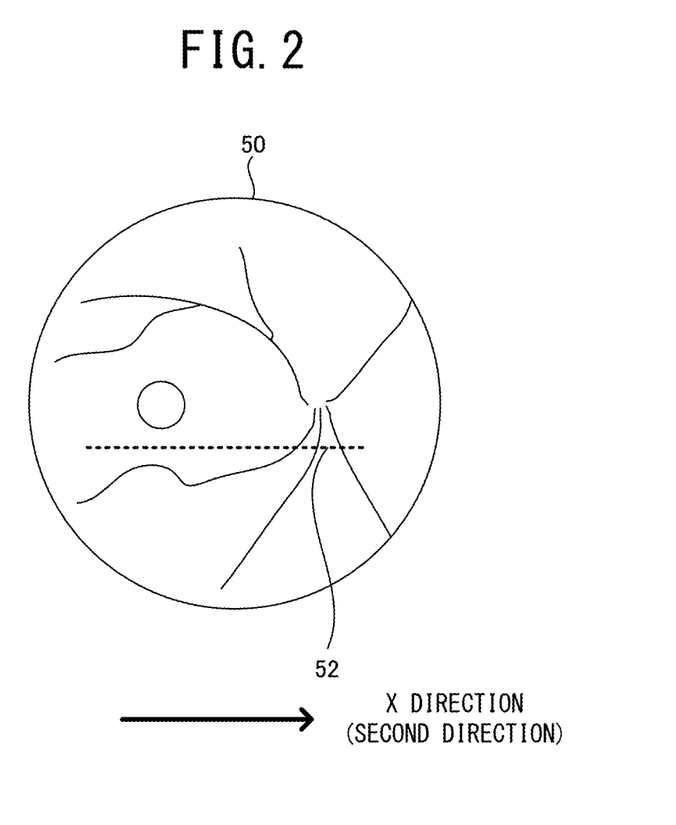
FIG. 2 is a view for describing a method for photographing an ophthalmologic image of a tissue 50 of a subject eye using an ophthalmologic image photographing device 1.

A photographing method of the ophthalmologic image for which the alignment process is performed by the ophthalmologic image processing device 40 of the present embodiment and one example of a configuration of the ophthalmologic image will be described with reference to FIG. 2 and FIG. 3. As shown in FIG. 2, the ophthalmologic image photographing device 1 of the present embodiment scans the tissue 50 of a living body (fundus tissue in the example shown in FIG. 2) with a spot-like light (measurement light). Specifically, the ophthalmologic image photographing device 1 of the present embodiment scans the tissue 50 on a scanning line 52 extending in a predetermined direction with the light and thereby photographs a two-dimensional scanned image (tomographic image in the present embodiment) 61 (see FIG. 3) that extends in a Z direction along the optical axis of the light and an X direction crossing (orthogonal to, in the present embodiment) the Z direction.

Figure 3:
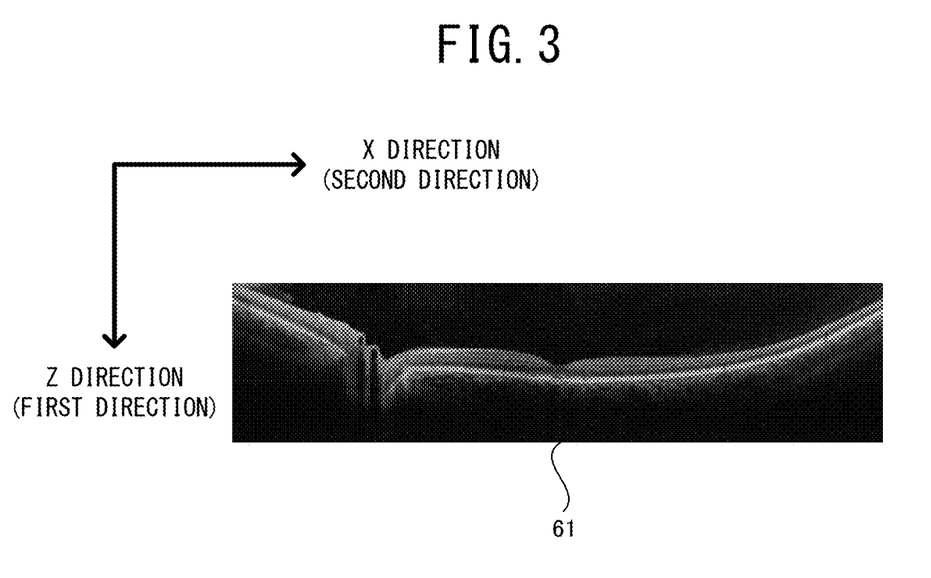
FIG. 3 illustrates one example of an ophthalmologic image 61 photographed by the ophthalmologic image photographing device 1.

As shown in FIG. 3, in the present embodiment, a direction of scanning the tissue with the spot-like measurement light (also referred to as "B-scanning direction") is defined as the X direction. Further, a depth direction of the tissue 50 along the optical axis of the measurement light (namely, a direction orthogonal to the X direction, which is also referred to as "A-scanning direction") is defined as the Z direction. In the ophthalmologic image exemplarily shown in FIG. 3, not only might be a position shift with respect to the B-scanning direction (X direction) caused when scanning the tissue with the measurement light but also a position shift with respect to the A-scanning direction in each A-scanning image (namely, an image formed by pixels aligned in the A-scanning direction for each position in the B-scanning direction) might be caused. When the distortion is caused in the ophthalmologic image 61 due to the posture of the tissue, the position shift with respect to each direction becomes more complex. The ophthalmologic image processing device 40 of the present embodiment cancels both of the position shift with respect to the A-scanning direction and the position shift with respect to the B-scanning direction and appropriately performs the alignment of the ophthalmologic images 61. In the present embodiment, the A-scanning direction (Z direction) is defined as a first direction, and the B-scanning direction (X direction) is defined as a second direction.

The ophthalmologic image process of the present embodiment will be described with reference to FIG. 4 to FIG. 8. In the present embodiment, the ophthalmologic image processing device 40, which is the PC, acquires the data of the ophthalmologic images 61 (hereinafter, also merely referred to as "ophthalmologic image 61) from the ophthalmologic image photographing device 1 and performs the alignment of the acquired ophthalmologic images 61. However, as described above, other device may function as the ophthalmologic image processing device. For example, the ophthalmologic image photographing device 1 itself may perform the ophthalmologic image process. Also, the processors (for example, the CPU 31 of the ophthalmologic image photographing device 1 and the CPU 41 of the ophthalmologic image processing device 40) may work together to perform the ophthalmologic image process. The CPU 41 of the ophthalmologic image processing device 40 performs the ophthalmologic image process shown in FIG. 4 in accordance with the ophthalmologic image processing program stored in the NVM 44.

Firstly, the CPU 41 acquires the data of the ophthalmologic images 61 generated by photographing the same part in the tissue of the same subject eye (S1). As exemplarily shown in FIG. 3 and FIG. 5, the ophthalmologic image 61 of the present embodiment is a scanned image extending in the first direction and the second direction (in the present embodiment, two-dimensional tomographic image).

And then, the CPU 41 sets at least one of the ophthalmologic images 61 acquired in S1 to a first ophthalmologic image (reference image) 61A that is a reference for performing the alignment of the ophthalmologic images 61 (S2). In the following processes described below, second ophthalmologic images 61B among the ophthalmologic images 61 acquired in S1 except the first ophthalmologic image 61A are aligned to the first ophthalmologic image 61A, which is the reference image, so that the alignment of the ophthalmologic images 61 is performed.

Here, when the image, which is not favorably photographed (for example, the degree of the position shift is large, or the like), among the ophthalmologic images 61 is set to the first ophthalmologic image 61 served as the reference image, it is difficult to appropriately perform the alignment of the ophthalmologic images 61. In the processes described below, the local alignment is performed between the images, and therefore it is preferable that the image having a common characteristic existing in all images is set to the first ophthalmologic image 61A served as the reference image. Accordingly, in S2 of the present embodiment, the CPU 41 averages at least two of the ophthalmologic images 61 acquired in S1 to generate an addition-averaged image, and then the CPU 41 sets the ophthalmologic image 61 of which the similarity to the generated addition-averaged image is the highest (for example, the correlation is the highest), to the first ophthalmologic image 61A.

However, the setting method for the first ophthalmologic image 61A may be modified. For example, the CPU 41 may set the ophthalmologic image 61 of which the image quality (for example, low noise or edge sharpness) is the highest among the ophthalmologic images 61, to the first ophthalmologic image 61A. Further, the CPU 61 may randomly select one of the ophthalmologic images 61 and set the selected image to the first ophthalmologic image 61A.

The CPU 41 sets one of the ophthalmologic images 61 other than the first ophthalmologic image 61A among the ophthalmologic images 61 acquired in S1, to a second ophthalmologic image 61B for which the alignment is performed. As described above, in each ophthalmologic image 61, both of the position shift with respect to the A-scanning direction (the X direction served as the first direction) and the position shift with respect to the B-scanning direction (the Z direction served as the second direction) might be caused.

Figure 5:
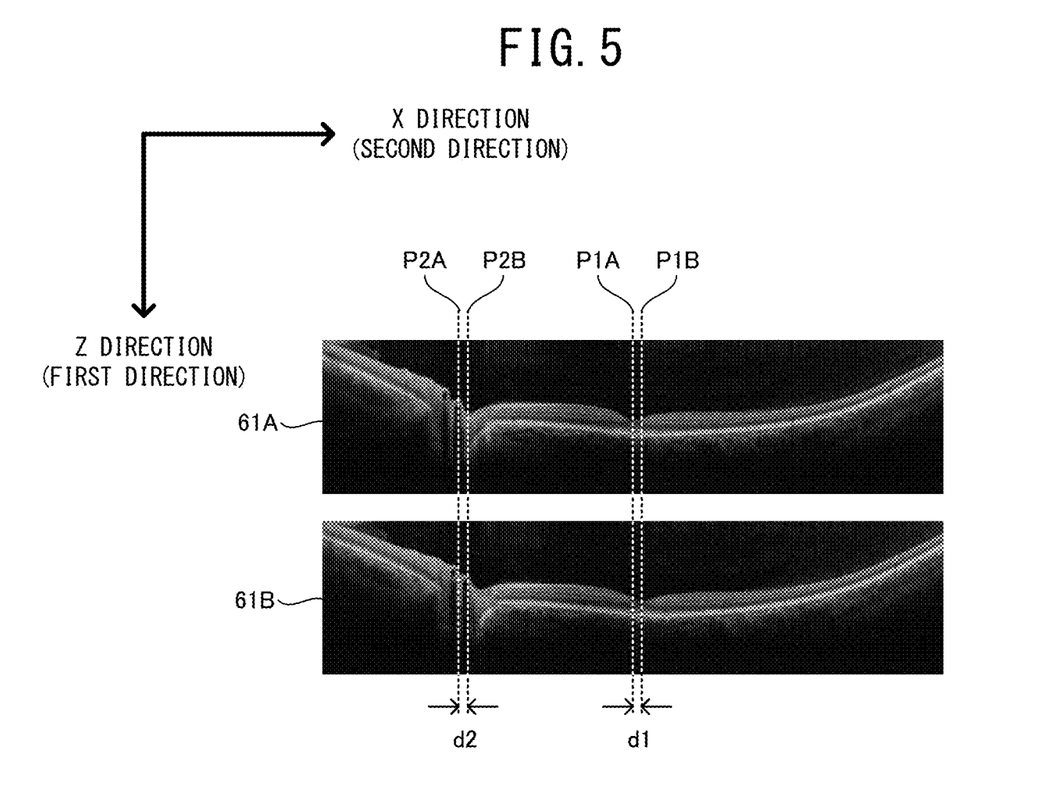
FIG. 5 illustrates one example of a first ophthalmologic image 61A and a second ophthalmologic image 61B before the alignment thereof is performed.

In the example shown in FIG. 5, the position shift of a distance d1 is caused between an X coordinate PIA of a first characteristic part in the first ophthalmologic image 61A and an X coordinate PIB of the first characteristic part in the second ophthalmologic image 61B. Further, the position shift of a distance d2 is caused between an X coordinate P2A of a second characteristic part in the first ophthalmologic image 61A and an X coordinate P2B of the second characteristic part in the second ophthalmologic image 61B. That is, the position shift with respect to the X direction (second direction) is caused between the first ophthalmologic image 61A and the second ophthalmologic image 61B. Further, although the detail thereof is described below, the position shift with respect to the Z direction (first direction) is also caused between the first ophthalmologic image 61A and the second ophthalmologic image 61B in each of the A-scanning images.

Figure 4:
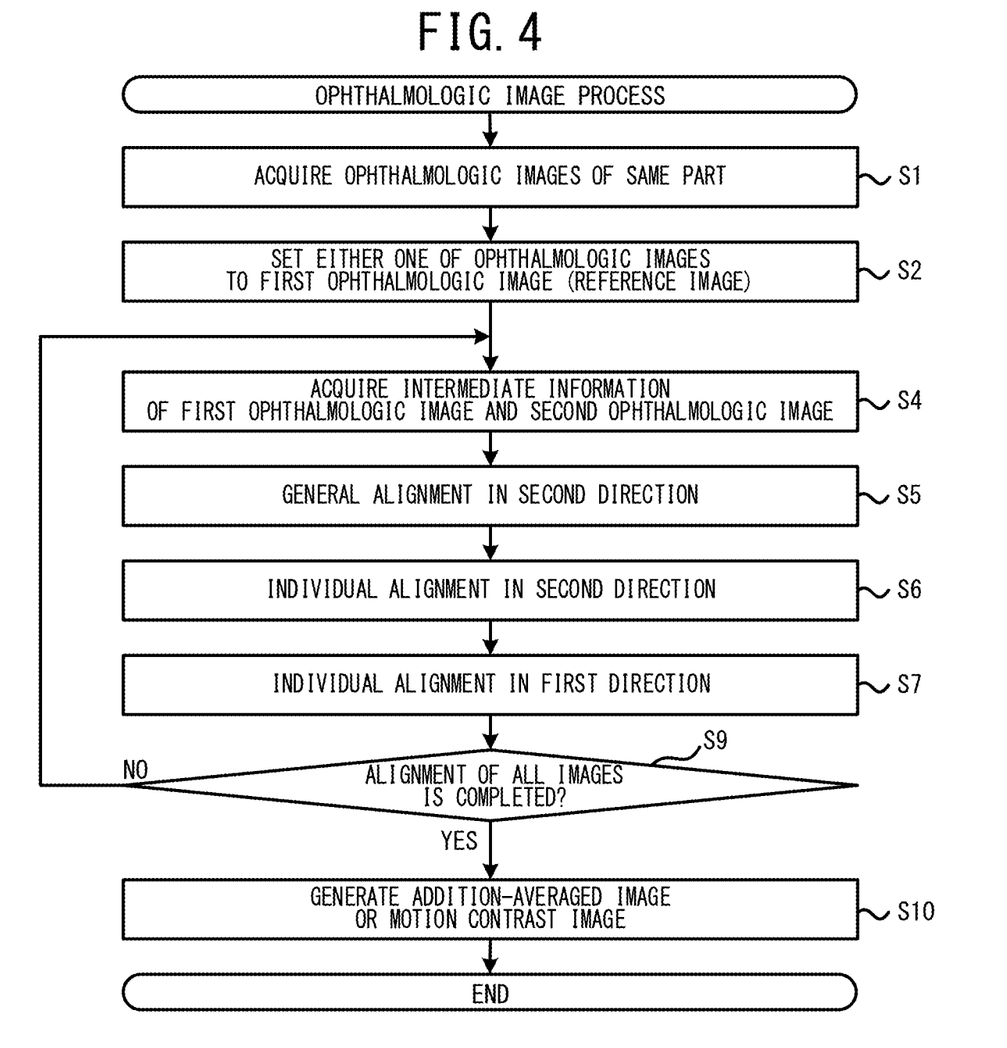
FIG. 4 is a flowchart illustrating an ophthalmologic image process performed by an ophthalmologic image processing device 40.

The description is returned to FIG. 4. The CPU 41 acquires intermediate information for each of the first ophthalmologic image 61A and the second ophthalmologic image 61B (S4). The intermediate information excludes the influence of the position shift with respect to the first direction (Z direction) at each position in the second direction (X direction). It is difficult to precisely perform the alignment with respect to the second direction between the first ophthalmologic image 61A and the second ophthalmologic image 61B in a state in which the position shift with respect to the first direction has been caused. Thus, the CPU 41 uses the intermediate information that excludes the influence of the position shift with respect to the first direction, so that the precision of the alignment with respect to the second direction is improved.

Specifically, in S4 of the present embodiment, the CPU 41 acquires information of a power spectrum image as the intermediate information. The power spectrum image is acquired by applying the Fourier transform with respect to the first direction (Z direction) to the ophthalmologic image 61 (each of the first ophthalmologic image 61A and the second ophthalmologic image 61B). The power spectrum image indicates an absolute value of amplitude in each frequency at each position in the second direction (X direction). Thus, in the acquired power spectrum image, the influence of the position shift with respect to the first direction (Z direction) is excluded.

Figure 6:
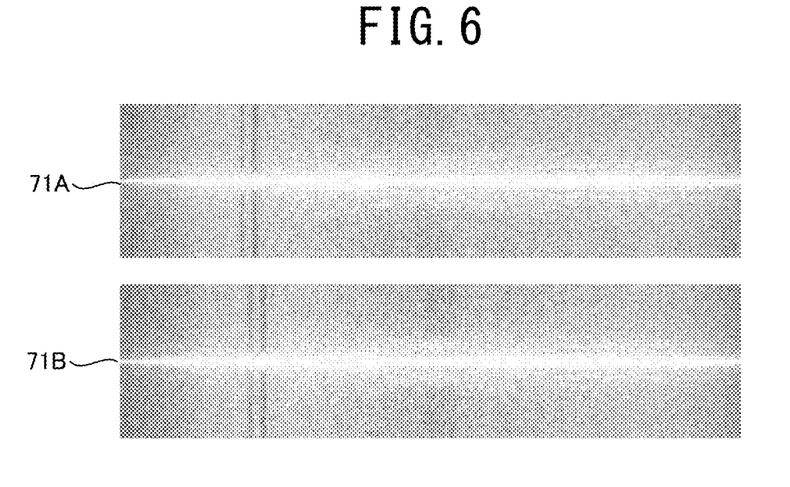
FIG. 6 illustrates first intermediate information 71A acquired from the first ophthalmologic image 61A and second intermediate information 71B acquired from the second ophthalmologic image 61B.

FIG. 6 illustrates first intermediate information (first power spectrum image) 71A acquired from the first ophthalmologic image 61A and second intermediate information (second power spectrum image) 71B acquired from the second ophthalmologic image 61B. As shown in FIG. 6, since information relating to the position shift with respect to the first direction is not included in each of the first intermediate information 71A and the second intermediate information 71B, the position shift with respect to the second direction between both images is clearly seen. Thus, by using the information of the power spectrum image as each of the intermediate information 71A and 71B, the alignment with respect to the second direction between the first ophthalmologic image 61A and the second ophthalmologic image 61B is precisely performed in a state in which the influence of the position shift with respect to the first direction is suppressed.

The description is returned to FIG. 4. The CPU 41 performs the alignment with respect to the second direction (X direction) between the first ophthalmologic image 61A and the second ophthalmologic image 61B based on the first intermediate information 71A acquired from the first ophthalmologic image 61A and the second intermediate information 71B acquired from the second ophthalmologic image 61B (S5 and S6). Specifically, in the present embodiment, after the general alignment (S5) between both images is performed, the individual alignment (S7) is performed.

In the general alignment (S5), the CPU 41 corrects the whole position of one of the first ophthalmologic image 61A and the second ophthalmologic image 61B (in the present embodiment, the second ophthalmologic image 61B) in the second direction (namely, the whole position is moved parallel in the second direction) so as to align the one of the first ophthalmologic image 61A and the second ophthalmologic image 61B to the other one (in the present embodiment, the first ophthalmologic image 61A). As a result, the alignment with respect to the second direction between the first ophthalmologic image 61A and the second ophthalmologic image 61B is performed while keeping the relative positional relation in the second direction within each of the ophthalmologic images 61 as a whole. Thus, the rough alignment with respect to the second direction is easily performed.

As one example, in the general alignment (S5) of the present embodiment, the CPU 41 performs the alignment with respect to the second direction between the first ophthalmologic image 61A and the second ophthalmologic image 61B using the phase only correlation with reference to the first intermediate information 71A and the second intermediate information 71B. In the phase only correlation, the image information (intermediate information 71A and 71B) is subjected to the Fourier transform to be decomposed into the information of the amplitude and the information of the phase. And then, the CPU 41 acquires the correlation between the first intermediate information 71A and the second intermediate information 71B using only the phase information without using the amplitude information in which the shape information is not included. The CPU 41 sets a movement direction and a movement distance in the X direction in the second intermediate information 71B when the correlation between the first intermediate information 71A and the second intermediate information 71B is the highest, to a movement direction and a movement distance in the X direction of the second ophthalmologic image 61B relative to the first ophthalmologic image 61A. As a result, the general alignment is appropriately performed.

In the individual alignment (S6), the CPU 41 performs the alignment with respect to the second direction between the first ophthalmologic image 61A and the second ophthalmologic image 61B for each position in the second direction (X direction) based on the first intermediate information 71A and the second intermediate information 71B. As a result, even in a case in which the position shift amount with respect to the second direction of the first ophthalmologic image 61A and the position shift amount with respect to the second direction of the second ophthalmologic image 61B are different depending on their positions in the second direction, the alignment with respect to the second direction between both images is precisely performed.

As one example, in the individual alignment (S6) of the present embodiment, the CPU 41 performs the individual alignment for each position in the second direction of the second ophthalmologic image 61B relative to the first ophthalmologic image 61A using a matching based on the dynamic programming (so-called DP matching or elastic matching) with reference to the first intermediate information 71A and the second intermediate information 71B. As a result, the alignment with respect to the second direction is appropriately performed in accordance with the position in the second direction. However, the method of the individual alignment may be modified. For example, the CPU 41 may approximate a correction amount at each position in the second direction (namely, the movement amount in the second direction) by a function with X as a variable.

Figure 7:
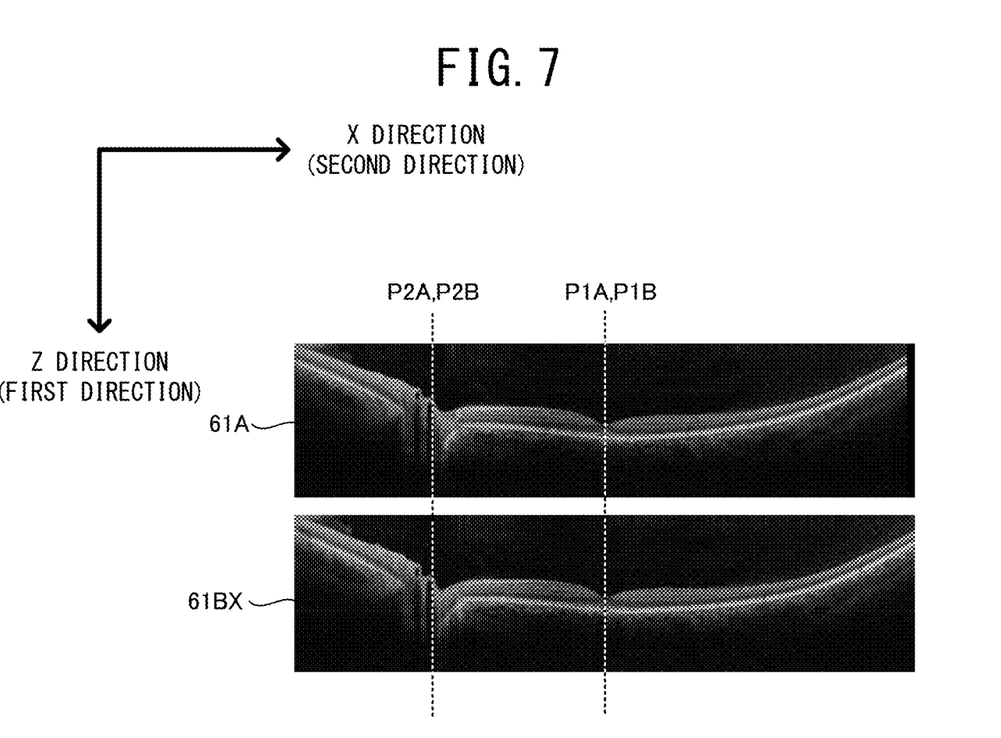
FIG. 7 illustrates one example of the first ophthalmologic image 61A and a second ophthalmologic image 61BX for which the alignment with respect to a second direction is performed.

FIG. 7 illustrates the first ophthalmologic image 61A and an ophthalmologic image 61BX for which the alignment (S5 and S6) with respect to the second direction relative to the first ophthalmologic image 61A has been performed, side by side in the Z direction. As shown in FIG. 7, by performing the alignment with respect to the second direction between both images based on the intermediate information 71A and 71B excluding the influence of the position shift with respect to the first direction (Z direction), both of the position shifts of the X coordinates PIA and PIB of the first characteristic part and the position shifts of the X coordinates P2A and P2B of the second characteristic part are precisely cancelled.

As described above, in the present embodiment, both of the general alignment with respect to the second direction between the first ophthalmologic image 61A and the second ophthalmologic image 61B (S5) and the individual alignment (S6) are performed. Thus, the alignment with respect to the second direction between both images is precisely performed. While, even in a case in which either one of the general alignment (S5) and the individual alignment (S6) is performed, by performing the alignment with respect to the second direction based on the intermediate information 71A and 71B excluding the influence of the position shift with respect to the first direction (Z direction), the alignment with respect to the second direction is appropriately performed.

And then, the CPU 41 performs the alignment with respect to the first direction (Z direction) between the pixels at the same position in the second direction (X direction) in the first ophthalmologic image 61A and the second ophthalmologic image 61BX (see FIG. 7) for which the alignment with respect to the second direction (S5 and S6) has been performed (S7). Accordingly, the alignment with respect to the first direction between both images is also precisely performed in a state in which the influence of the position shift with respect to the second direction is suppressed.

Figure 8:
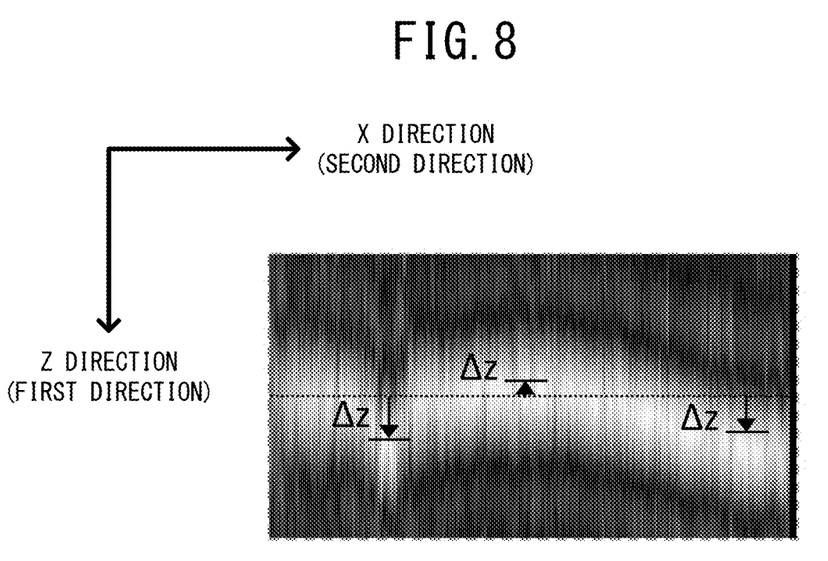
FIG. 8 illustrates a view for describing one example of an alignment process with respect to a first direction.

As one example, in S7 of the present embodiment, the CPU 41 performs the alignment with respect to the first direction between the pixels at the same position in the second direction in the first ophthalmologic image 61A and the second ophthalmologic image 61BX (in the present embodiment, the alignment of the pixel in the second ophthalmologic image 61BX to the pixel in the first ophthalmologic image 61A), using the phase only correlation described above. As shown in FIG. 8, the CPU 41 acquires the movement direction with respect to the first direction and the movement amount AZ such that the correlation between the pixels at the same position in the second direction becomes the highest, for each position in the second direction. As a result, the alignment with respect to the first direction between both images is appropriately performed.

And then, in a state in which the alignment for all of the ophthalmologic images 61 acquired in S1 has not been completed (S9: NO), the process returns to S4 and the process repeats S4 to S7 for the ophthalmologic image 61 for which the alignment has not been performed yet, as the second ophthalmologic image 61B. In a case in which the alignment for all of the ophthalmologic images 61 is completed (S9: YES), an addition-averaged image or a motion contrast image is generated based on the ophthalmologic images 61 for which the alignment has been performed (S10). Since the alignment has been precisely performed for the ophthalmologic images 61, the addition-averaged image or the motion contrast image with high quality is generated in S10.

Figure 9:
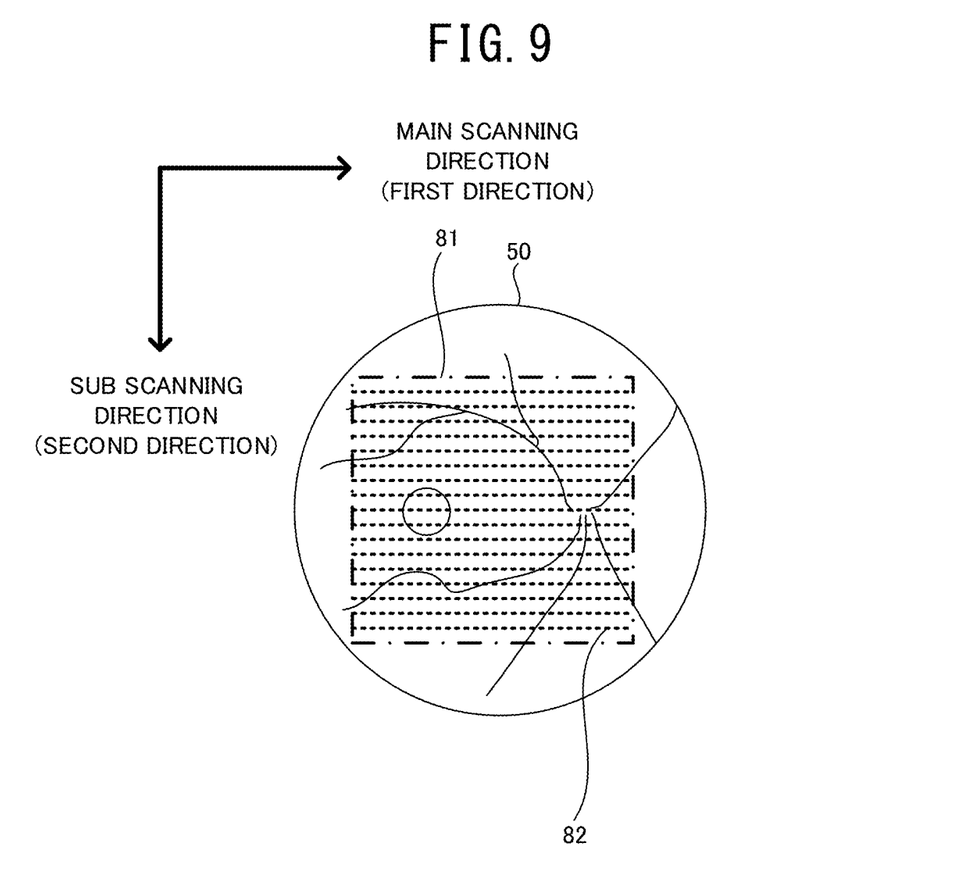
FIG. 9 is a view for describing a method for photographing the tissue 50 of the subject eye using an ophthalmologic image photographing device according to a modified example.

The technique disclosed in the above embodiment is merely one example. Accordingly, the technique exemplarily described in the above embodiment may be modified. The ophthalmologic image processing device 40 of the above embodiment performs the alignment of the ophthalmologic images 61 photographed by the OCT device served as the ophthalmologic image photographing device 1. However, the ophthalmologic image photographing device that photographs the ophthalmologic images to be aligned is not limited to the OCT device. For example, as shown in FIG. 9, the ophthalmologic image photographing device that photographs the ophthalmologic image may be a device that photographs an image of a two-dimensional region 81 on the tissue 50 by scanning the tissue 50 with the spot-like light on a scanning line 82 along a main scanning direction and moving the scanning line 82 in a sub scanning direction crossing (for example, orthogonal to) the main scanning direction (for example, a scanning laser ophthalmoscope (SLO) or the like).

In this case, not only might be the position shift between the scanning lines 82 caused when the scanning line 82 is being moved in the sub scanning direction but also the position shift might be caused when the light is being moved on each scanning line 82 in the ophthalmologic image. Against this, as exemplarily described in the above embodiment, the ophthalmologic image processing device performs the alignment with respect to the second direction, which is one of the main scanning direction and the sub scanning direction, based on the intermediate information excluding the influence of the position shift with respect to the first direction, which is the other one of the main scanning direction and the sub scanning direction, and then the ophthalmologic image processing device performs the alignment with respect to the first direction. Consequently, the alignment between the ophthalmologic images is appropriately performed.

The first direction may be the main scanning direction, and the second direction may be the sub scanning direction. In this case, the alignment between the ophthalmologic images with respect to the sub scanning direction of which a large position shift might be caused is performed in a state in which the influence of a small position shift caused when scanning the tissue with the light in the main scanning direction at a high speed is excluded. Thus, the alignment between the ophthalmologic images is more appropriately performed.

However, also in a case in which the first direction is the sub scanning direction and the second direction is the main scanning direction, the alignment between the ophthalmologic images is appropriately performed. Similarly, also in a case in which the first direction (A-scanning direction) and the second direction (B-scanning direction) of the above embodiment are reversed, the alignment between the ophthalmologic images is appropriately performed.

The ophthalmologic image photographing device that photographs the ophthalmologic images for which the alignment is performed may be a device that photographs the ophthalmologic images by irradiating and scanning a two-dimensional region with light extending in a one-dimensional direction (for example, a line scan SLO, a line scan OCT, or the like). In this case, the one-dimensional direction in which the light to be irradiated extends is set to the first direction, and a scanning direction of the light is set to the second direction, so that the alignment with respect to the second direction between the ophthalmologic images is performed in a state in which the influence of the small position shift caused in the first direction is excluded. However, as described above, the first direction and the second direction may be reversed. Further, the ophthalmologic image photographing device may be a rolling shutter type photographing device, a photographing device that scans a two-dimensional region with a measurement light to be irradiated, or the like.

In the above embodiment, the alignment process is performed after all of the ophthalmologic images 61 are photographed. However, the alignment between the reference image (first ophthalmologic image 61A) and the second ophthalmologic image 61B may be performed every time when each of the second ophthalmologic images 61B to be aligned relative to the reference image is photographed. In this case, the ophthalmologic image 61 that is firstly photographed among a plurality of the ophthalmologic images 61 may be set to the first ophthalmologic image 61A served as the reference image.

The above embodiment describes an example that performs the alignment between the two-dimensional ophthalmologic images 61. However, at least a part of the technique exemplarily described in the above embodiment may be adopted to perform the alignment between three-dimensional ophthalmologic images. In this case, one of the first direction and the second direction may be a two-dimensional direction (plane direction).

The process that acquires the ophthalmologic images in S1 shown in FIG. 4 is one example of "acquiring images". The process that acquires the intermediate information in S4 shown in FIG. 4 is one example of "acquiring intermediate information". The process that performs the alignment with respect to the second direction in S5 and S7 shown in FIG. 4 is one example of "first alignment". The process that performs the alignment with respect to the first direction in S7 shown in FIG. 4 is one example of "second alignment". The process that performs the general alignment in S5 shown in FIG. 4 is one example of "general alignment". The process that performs the individual alignment in S6 shown in FIG. 4 is one example of "individual alignment".

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An ophthalmologic image processing device that processes data of ophthalmologic images of a tissue of a subject eye, including a first ophthalmologic image and a second ophthalmologic image, wherein the ophthalmologic images are scanning images that extend in a first direction and a second direction crossing the first direction and are acquired by scanning the tissue of the subject eye with light and temporally continuously receiving the light from the tissue, the ophthalmologic image processing device comprising a processor, wherein the processor performs:
acquiring the first ophthalmologic image and the second ophthalmologic image, the first and the second ophthalmologic images being generated by photographing the same part in the tissue of the same subject eye;
acquiring intermediate information that is information of the first ophthalmologic image and the second ophthalmologic image from which an influence of a position shift with respect to the first direction at each position in the second direction is excluded, the intermediate information being information of a power spectrum image that is acquired by applying a Fourier transform, with respect to the first direction, to each of the first and second ophthalmologic images;
first alignment that performs alignment with respect to the second direction between the first ophthalmologic image and the second ophthalmologic image, based on the intermediate information acquired from the first ophthalmologic image and the intermediate information acquired from the second ophthalmologic image; and
second alignment that performs alignment with respect to the first direction between pixels at the same position with respect to the second direction in the first ophthalmologic image and the second ophthalmologic image for which the alignment with respect to the second direction has been performed in the first alignment.

2. The ophthalmologic image processing device according to claim 1, wherein, in the first alignment, the processor performs general alignment in which the alignment with respect to the second direction between the first ophthalmologic image and the second ophthalmologic image is performed while keeping a relative positional relation in the second direction within each of the first ophthalmologic image and the second ophthalmologic image, based on the intermediate information of the first ophthalmologic image and the intermediate information of the second ophthalmologic image.

3. The ophthalmologic image processing device according to claim 1, wherein, in the first alignment, the processor performs individual alignment in which the alignment with respect to the second direction is performed for each position in the second direction, based on the intermediate information of the first ophthalmologic image and the intermediate information of the second ophthalmologic image.

4. The ophthalmologic image processing device according to claim 1, wherein:
- an ophthalmologic image photographing device that photographs the first and the second ophthalmologic images is an OCT device that photographs a tomographic image of a tissue by scanning the tissue with a spot-like measurement light;
- the first direction is an A-scanning direction defined by a depth direction of the tissue along the optical axis of the measurement light; and
- the second direction is a B-scanning direction defined by a scanning direction of the tissue with the measurement light.

5. The ophthalmologic image processing device according to claim 1, wherein:
- an ophthalmologic image photographing device is configured to photograph an image of a tissue by scanning the tissue with a spot-like light on a scanning line along a main scanning direction and moving the scanning line in a sub scanning direction crossing the main scanning direction;
- the first direction is the main scanning direction; and
- the second direction is the sub scanning direction.

6. A non-transitory computer-readable storage medium storing computer-readable instructions that, when executed by a processor of an ophthalmologic image processing device that processes data of ophthalmologic images of a tissue of a subject eye, including a first ophthalmologic image and a second ophthalmologic image, wherein the ophthalmologic images are scanning images that extend in a first direction and a second direction crossing the first direction and are acquired by scanning the tissue of the subject eye with light and temporally continuously receiving the light from the tissue, causes the ophthalmologic image processing device to perform processes comprising:
- acquiring the first ophthalmologic image and the second ophthalmologic image, the first and the second ophthalmologic images being generated by photographing the same part in the tissue of the same subject eye;
- acquiring intermediate information that is information of the first ophthalmologic image and the second ophthalmologic image from which an influence of a position shift with respect to the first direction at each position in the second direction is excluded, the intermediate information being information of a power spectrum image that is acquired by applying a Fourier transform, with respect to the first direction, to each of the first and second ophthalmologic images;
- first alignment that performs alignment with respect to the second direction between the first ophthalmologic image and the second ophthalmologic image, based on the intermediate information acquired from the first ophthalmologic image and the intermediate information acquired from the second ophthalmologic image; and
- second alignment that performs alignment with respect to the first direction between pixels at the same position with respect to the second direction in the first ophthalmologic image and the second ophthalmologic image for which the alignment with respect to the second direction has been performed in the first alignment.

* * * * *